United States Patent [19]
Hedgecock, Jr.

[11] Patent Number: 5,886,782
[45] Date of Patent: Mar. 23, 1999

[54] VEHICLE REAR END ALIGNMENT DEVICE

[76] Inventor: Wesley Javan Hedgecock, Jr., 1520 Horney Town Rd., High Point, N.C. 27265

[21] Appl. No.: 8,452

[22] Filed: Jan. 16, 1998

[51] Int. Cl.⁶ ..................................................... G01B 11/26

[52] U.S. Cl. ........................... 356/155; 33/288; 33/203.18

[58] Field of Search ..................................... 356/154, 155, 356/152.1, 152.2, 152.3, 153, 139.09, 138, 399–401; 33/203.18, 203.12, 203.13, 608, 600, 203.19, 288, 286, 287, 203.2, 203.21, 203.17, DIG. 21; 250/559.3, 559.37; 248/222.12, 222.14

[56] References Cited

U.S. PATENT DOCUMENTS 4,330,445  5/1982  Eck .
4,782,596  11/1988  Mieling .

*Primary Examiner*—K. P. Hantis
*Attorney, Agent, or Firm*—Kennedy, Covington, Lobdell & Hickman LLP

[57] ABSTRACT

A device used to align the rear end of a vehicle that can be mounted on the axle of the vehicle and that generates a linear laser beam that is perpendicular to the axis of the axle so that measurements can be made between the beam and the frame of the vehicle to assist in properly aligning the rear end of the vehicle relative to the frame.

5 Claims, 5 Drawing Sheets

VEHICLE REAR END ALIGNMENT DEVICE

BACKGROUND OF THE INVENTION

This invention relates generally to devices for use in properly aligning the rear end of a vehicle, and particularly devices of this type which are used for aligning the rear end of a race car.

As is well known, if the rear end of a vehicle is misaligned relative to the frame of the vehicle, problems are created in terms of the handling of the vehicle and tire wear. When misalignment of the rear end occurs in race cars, the problems are exacerbated by the high speed at which the vehicle travels, and even a variance of ¼-inch can create major problems.

Accordingly, it is important that the rear end of a vehicle be precisely aligned, and several prior art devices have been used to assist in obtaining as precise an alignment as possible. One such device includes two stanchions having a string extending generally horizontally therebetween, and this device is set up so that the stanchions are placed alongside of the vehicle with the horizontal string extending generally parallel to the side of the frame of the vehicle. Several vertical strings are then hung from the horizontal string at spaced intervals along the length thereof and a small weight is attached to the lower end of the vertical strings to maintain them at their vertical disposition. A measurement is then made from each of the spaced vertical strings to the frame, and to the extent there is any difference in these measurements indicating misalignment of the rear end, some adjustment is made in the position of the rear end in relation to the frame. While this device provides some assistance in properly aligning the rear end, it has several disadvantages, including some inherent inaccuracy resulting from the use of three or more strings, and the fact that it takes a considerable amount of time (e.g., thirty minutes) to set the device up for use. Also, each time some adjustment is made in the rear end, the position of the device must be reestablished before a second set of measurements can be made.

Another known device includes a longitudinally extending narrow plate that is mounted on wheels at its ends and a beam generator is mounted on the plate to direct a linear laser beam in a direction parallel to the extent of the narrow plate. In use, the device is rolled up to a location adjacent one of the rear tires of the vehicle, and one edge of the plate is pressed against the side wall of the bottom of the tire. With the device in this position, the beam generator is then turned on to generate a beam that extends along the side of the frame of the vehicle, and measurements are made at spaced intervals along the length of the frame to determine the distance between the side of the frame and the beam. To the extent that these measurements are different from one another, they indicate misalignment of the rear end, and adjustments are then made in the position of the rear end and the aforesaid procedure is repeated until the measurements are equal to one another.

While this device is a substantial improvement over the above-described string device, it also has a problem in terms of accuracy. More specifically, the position of the beam relative to the frame is dependent upon the position of the narrow plate which, in turn, is dependent upon the surface configuration of the side of a vehicle tire. Because of the geometry of the path of the beam, even a ⅛-inch variance of the side wall of the tire can result in a ½-inch variance at the far end of the beam from a true line indication of the actual position of the rear end relative to the frame. Since even a ¼-inch variance in the proper alignment of the rear end can create major problems in a race car, as discussed above, the potential for inaccuracy from this device is a serious drawback, and this drawback is compounded by the fact that the wheel of the vehicle on which the tire is mounted may include a further variance in the form of tire "wobble".

The present invention provides a device and method of use which overcomes the above-discussed known devices and which permits the rear end of the vehicle to be precisely aligned in a short period of time.

SUMMARY OF THE INVENTION

In accordance with the present invention, a device for use in properly aligning the rear end of a vehicle is provided, and this device includes a mounting member comprising a plate formed with an array of openings disposed to receive a corresponding array of studs extending outwardly from the hub assembly on the axle of a vehicle and parallel to the axis of each axle. A rigid arm extends outwardly from the mounting member, and a beam generator is mounted in the rigid arm and positioned therein to emit a linear beam that extends along a path that is perpendicular to the axis of the axle. In the preferred embodiment of this present invention generates a laser beam.

In use, the aforesaid device is mounted on the axle of the vehicle by placing the mounting member on the hub assembly mounted on the end of the axle, and by inserting the studs through the array of openings in the mounting member and securing the mounting member in place. The beam generator is then turned on to generate a linear beam that extends along the aforesaid path perpendicular to the rear axle of the vehicle. A number of measurements are made between the frame and the beam at predetermined intervals along the extent of the frame. If the measurements are different, thereby indicating some misalignment of the frame, the position of the rear end of the vehicle is adjusted relative to the frame to overcome the misalignment, and the procedure is then repeated until the measurements are all substantially equal. In the preferred embodiment of the present invention, the measuring of distance between the beam and the frame includes the step of temporarily mounting the measuring device on the frame to extend outwardly therefrom and into the path of the beam.

DESCRIPTION OF THE PREFERRED EMBODIMENT

Figure 1:
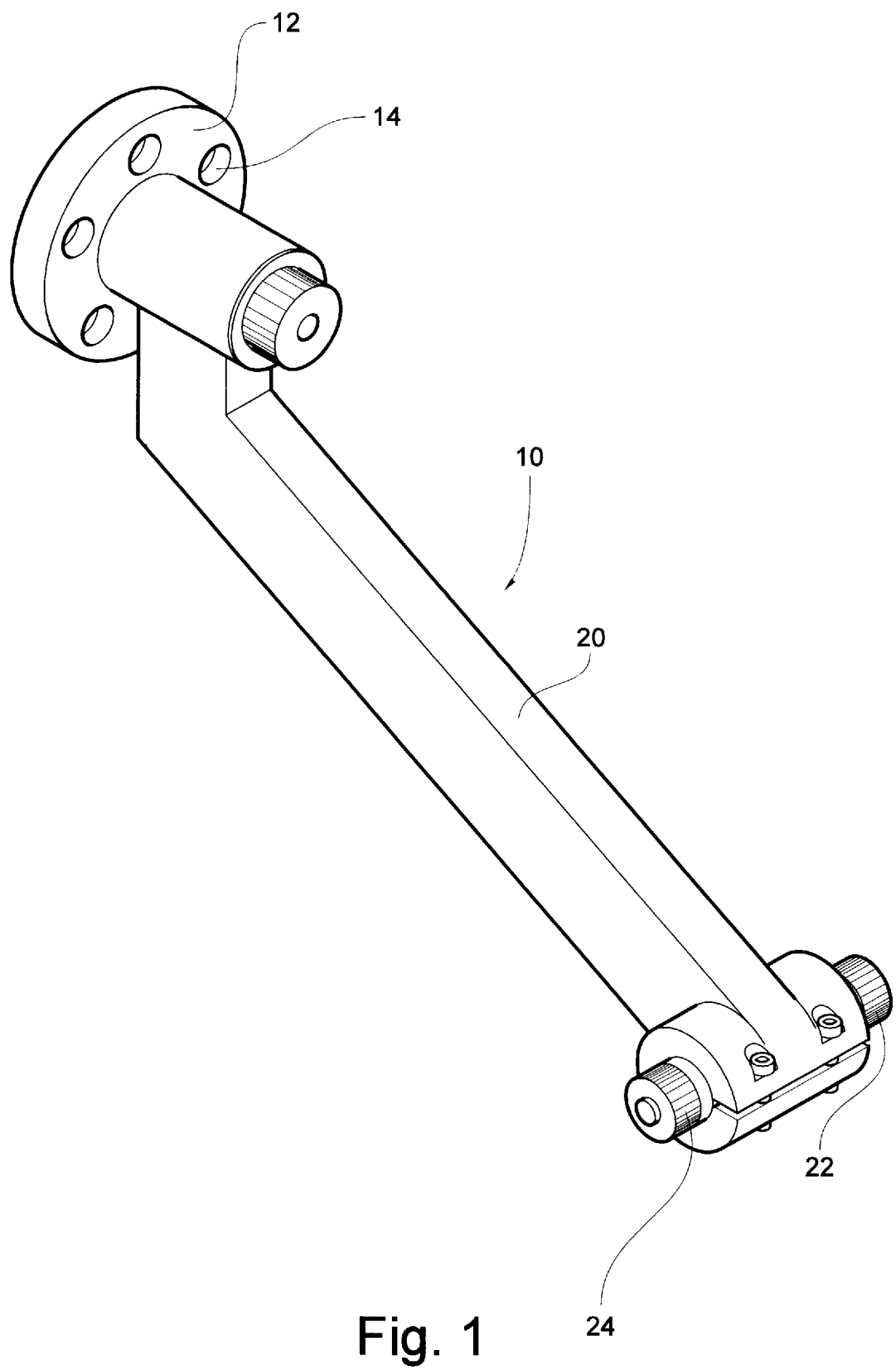
FIG. 1 is a perspective view of the alignment device of the present invention.
Figure 2:
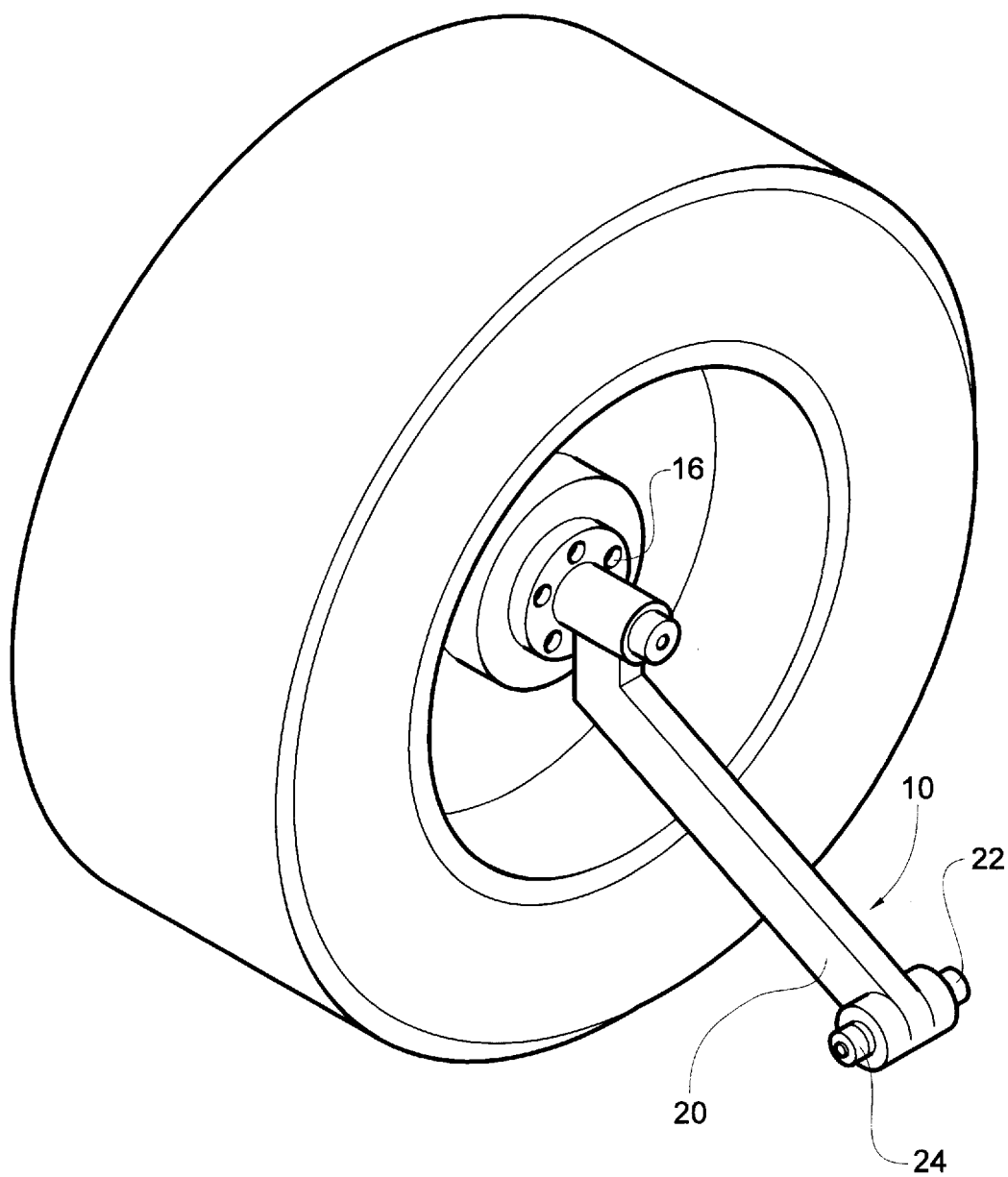
FIG. 2 illustrates the device of the present invention mounted on the rear axle of a vehicle.

Looking now in greater detail at the accompanying drawings, the device 10 of the present invention includes a mounting member 12, which is a flat, generally circular plate having an array of openings 14 formed therein. These openings 14 are disposed in a pattern to receive a corresponding conventional array of studs 16 that extend outwardly from the hub assembly on the axle 18 of a vehicle.

A rigid arm 20 is fixed to the mounting member 12 and extends outwardly therefore, and a beam generator 22 is mounted in the extending end of the rigid arm 20 and a switch 24 is provided for turning the beam generator 22 on and off. The beam generator 22 is preferably a conventional, known 650 watt laser beam generator, and the beam generator 22 is positioned in the rigid arm 20 so that when the mounting member 12 is mounted on the studs 16 the linear beam 26 (see FIG. 4) generated by the beam generator 22 extends along a path that is perpendicular to the axis of the axle 18.

Figure 3:
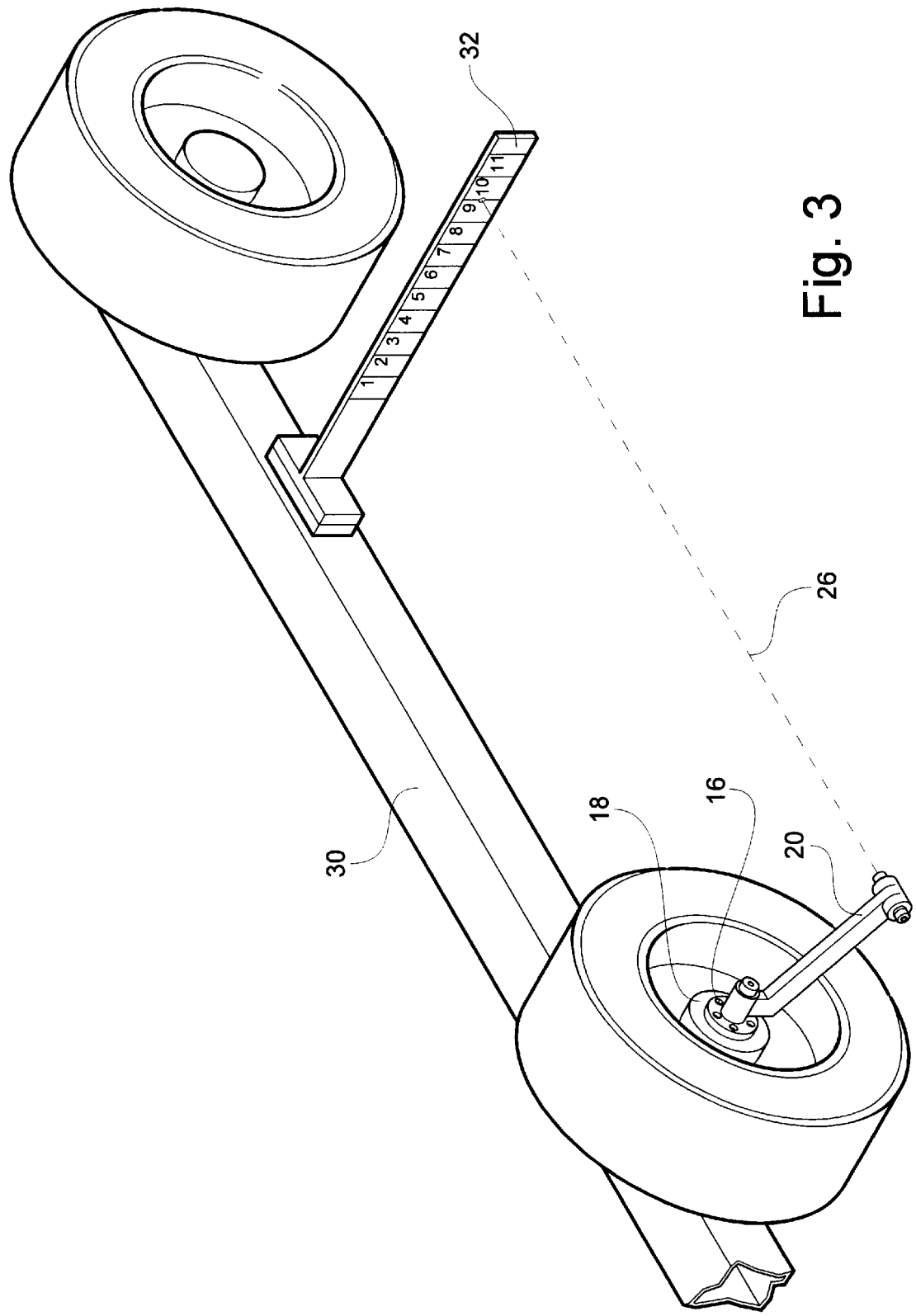
FIG. 3 shows a measuring device used with the device of the present invention.
Figure 4:
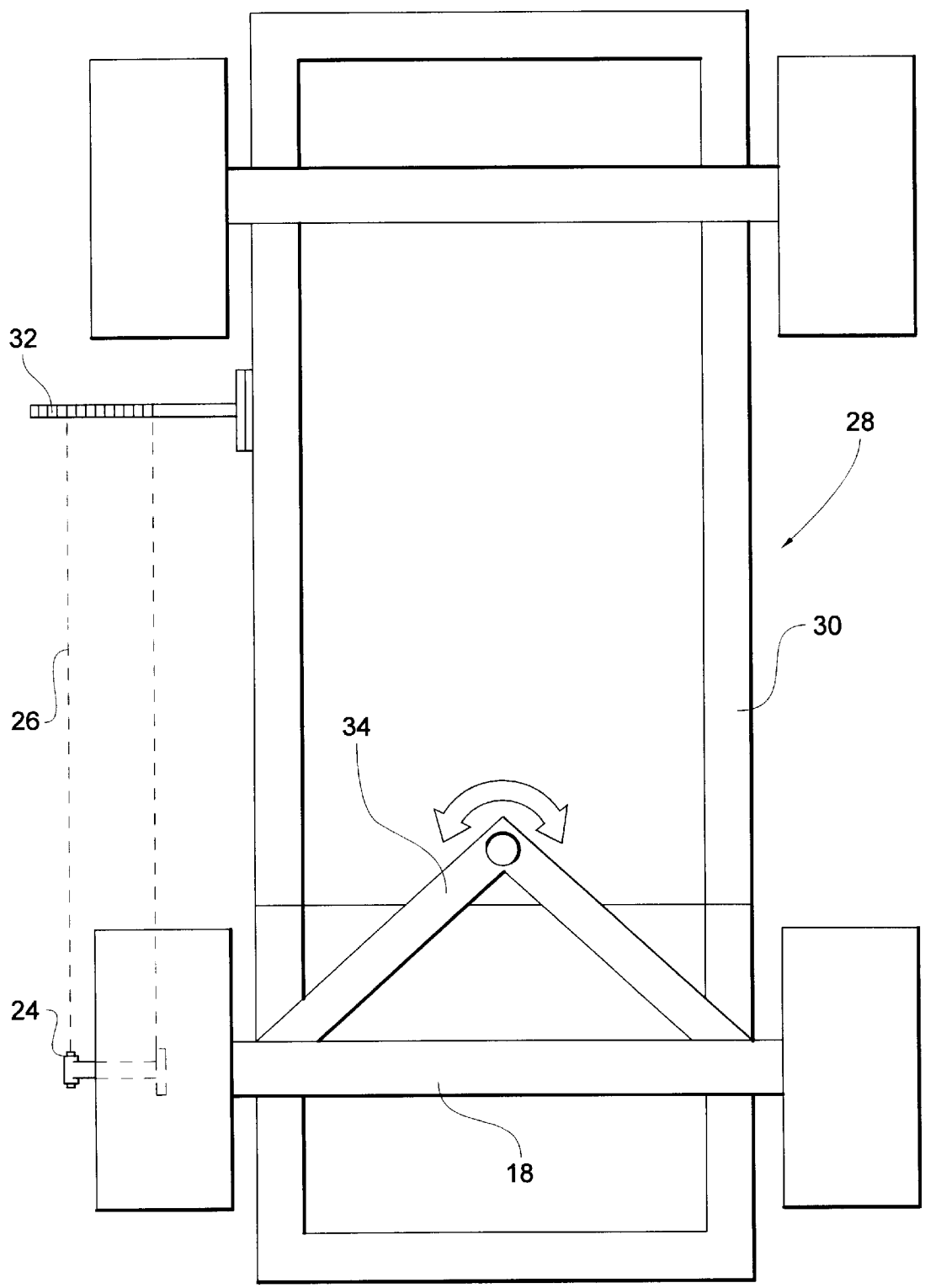
FIG. 4 is a diagrammatic view illustrating the use of the device of the present invention in aligning the rear end of a vehicle.
Figure 5:
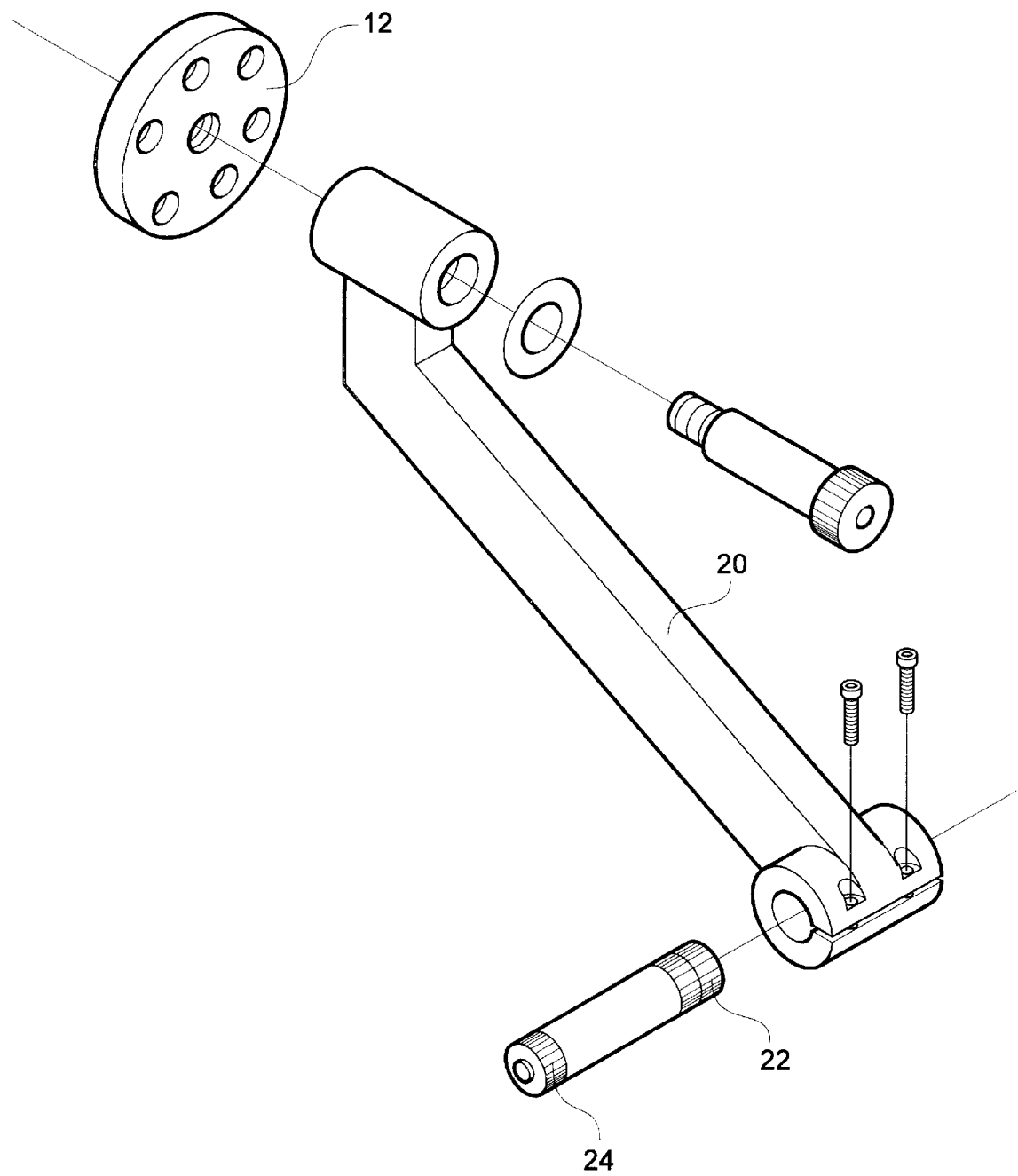
FIG. 5 is a exploded view of the device illustrated in FIG. 2.

The use of the device 10 of the present invention is illustrated diagrammatically in FIG. 4. The device 10 is mounted on the rear axle 18 of the vehicle 28 in the manner described above, and the beam generator 22 is turned on using the switch 24, whereupon a linear beam 26 is generated that extends perpendicularly to the axis of the axle 18 and generally along the side of the frame 30 of the vehicle. Then, some type of conventional measuring device 32, such as a ruler or the like, is mounted on, or placed adjacent, the frame 30 and arranged to extend outwardly from the frame 30 and into the path of the linear beam 26. The linear beam 26 will shine on the measuring device 32 to indicate therein the distance between frame 30 and beam 26 as best illustrated in FIG. 3. The measurements are made at several predetermined spaced intervals along the side of the frame 30.

Since the linear beam 26 extends perpendicularly to the axis of the rear axle 18 of the vehicle 28, any variance in measurements made between the linear beam 26 and the frame 30 indicates that the rear end 34 (illustrated diagrammatically in FIG. 4) of the vehicle 28 is out of alignment with the frame 30. The alignment of the rear end 34 is then adjusted to overcome the indicated misalignment using conventional rear end adjustment procedures which are well known in the art, and the measuring procedure described above is repeated until all of the measurements are substantially equal, thereby indicating that the rear end 34 is properly aligned.

It will be apparent from the above that the rigid connection of the device 10 to the axle of the vehicle, combined with the beam generator being positioned on the axle to generate a beam that is perpendicular to the axis of the axle, results in the beam being a very accurate reflection of the position of the rear end relative to the frame of the vehicle. Therefore, the device 10 of the present invention permits the rear end to be precisely and correctly aligned with the frame. Finally, the device 10 of the present invention offers an additional advantage in that it can be quickly and easily attached to the hub assembly on the axle of the vehicle in just a few minutes.

It will therefore be readily understood by those persons skilled in the art that the present invention is susceptible of broad utility and application. Many embodiments and adaptations of the present invention other than those therein described, as well as many variations, modifications and equivalent arrangements, will be apparent from or reasonably suggested by the present invention and the foregoing description thereof, without departing from the substance or scope of the present invention. Accordingly, while the present invention has been described therein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended thereto and the equivalents thereof.

I claim:

1. A device for use in properly aligning the rear end of a vehicle, said device comprising:

a) a mounting member comprising of a plate formed with an array of openings disposed to receive a corresponding array of studs extending outwardly from the axle of a vehicle and parallel to the axis thereof;

b) a rigid arm extending outwardly from said mounting member; and c) a beam generator mounted in said rigid arm and positioned therein to emit a linear beam that extends along a path that is perpendicular to said axis of said axle, whereby said beam can be used as a reference for determining if said rear end of the vehicle is out of alignment with the frame of the vehicle.

2. A device as defined in claim 1 wherein said beam generator generates a laser beam.

3. A method of properly aligning the rear end of a vehicle said method comprising the steps of:

a) attaching a beam generator to the axle of a vehicle so that beam generated by said extends along a linear path that is perpendicular to the axis of said axle of the vehicle and in a direction generally along the side of the frame of the vehicle;

b) measuring the distance between said beam and the side of said frame at predetermined intervals along the extent of said frame; and c) adjusting the rear end of said vehicle relative to said frame to the extent necessary to align the rear end of the vehicle relative to the frame so that all of said distances measured at each interval along the frame are substantially equal.

4. A method of properly aligning the rear end of a vehicle as defined in claim 3, wherein said beam is a laser beam.

5. A method of properly aligning the rear end of a vehicle as defined in claim 3, wherein said measuring step includes mounting a measuring device to the frame to extend outwardly therefrom and into the path of said beam.

* * * * *